H. R. ZIEBELL.
HEATER UNIT.
APPLICATION FILED MAY 10, 1921.
1,401,851. Patented Dec. 27, 1921.
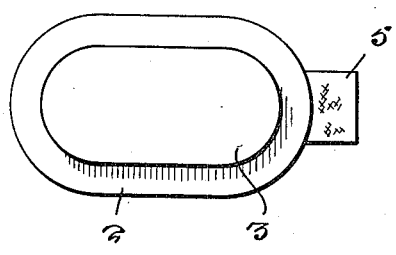
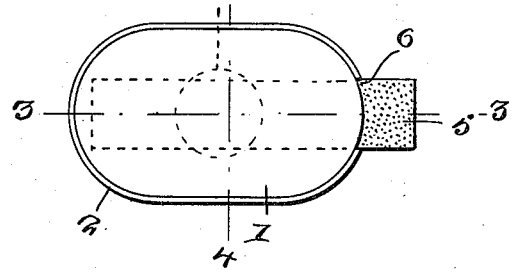
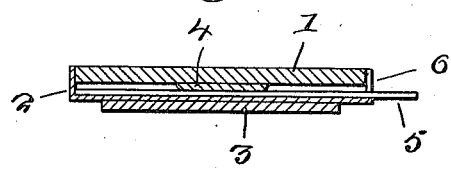
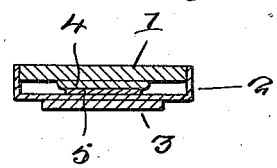
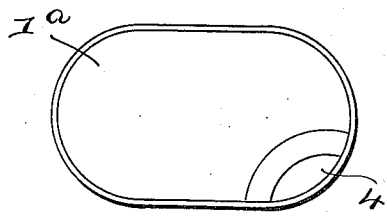
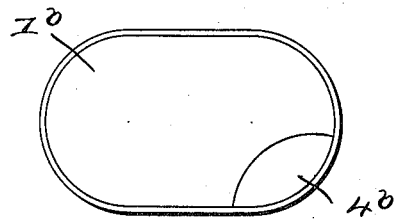
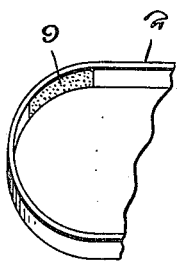
H. R. Ziebell
INVENTOR

UNITED STATES PATENT OFFICE.

HARVEY R. ZIEBELL, OF RIPON, WISCONSIN.

HEATER UNIT.

1,401,851.   Specification of Letters Patent.   Patented Dec. 27, 1921.

Application filed May 10, 1921. Serial No. 468,372.

*To all whom it may concern:*

Be it known that I, HARVEY R. ZIEBELL, a citizen of the United States, residing at Ripon, in the county of Fon du Lac and State of Wisconsin, have invented new and useful Improvements in Heater Units, of which the following is a specification.

The object of my present invention is the provision of a materially improved heater unit for use in conjunction with inner tube patches of the kind that are vulcanized when installed.

To the attainment of the foregoing, the invention consists in the improvement as hereinafter described and definitely claimed.

In the accompanying drawings, forming part of this specification:—

Figures 1 and 2 are views of opposite sides of one embodiment of my invention.

Figs. 3 and 4 are sections taken in the planes indicated by the lines 3—3 and 4—4, respectively, of Fig. 2.

Fig. 5 is a view of a modification of my invention.

Fig. 6 is a similar view of another modification of the invention.

Fig. 7 is a fragmentary perspective showing a portion of the interior of the pan.

Similar numerals designate corresponding parts in Figs. 1 to 4 to which reference will first be made.

The essential feature of my invention consists in the combination with the heating unit of ignition means.

In one embodiment of my invention the heating unit 1 is of impregnated strawboard paper, and is disposed in a pan 2 that carries exteriorly a patch 3, which patch may be and preferably is of a type well known on the market. In accordance with my invention the heating unit 1 is provided at its inner side with ignition means 4 appropriately incorporated with or attached to the unit 1. The said ignition means may be of any appropriate character such for instance as 32 parts of chlorate of potash, 12 parts of bichromate of potash, 32 parts of red lead, 24 parts of sulfid of antimony and 13 parts of glue. Interposed between the unit 1 and the ignition means 4, on the one hand, and the opposed wall of the pan 2, on the other, is an igniting strip 5 which extends through an opening 6 in one end of the pan 2. The said strip 5 is provided with any appropriate friction surface such for instance as a surface formed of amorphous phosphor 8 parts, sulfid of antimony 9 parts, and sufficient glue to serve as an adequate binder. When the strip 5 is pulled out through the opening or notch 6 in the pan 2, the means 4 will be ignited, and the unit 1 will be caused to burn in order to heat and vulcanize the patch 3. At this point I would have it understood that the unit 1 which may be properly designated the fuel unit may be of any appropriate material without involving departure from the scope of my claimed invention.

In the modification shown in Fig. 5 the fuel unit $1^a$ is provided in one corner and has attached thereto a body of ignition means $4^a$, which may be of the formula before described or of any other formula appropriate to the purpose. When this embodiment is resorted to, the interior of the flange on the pan 2 will be coated with a surface 9 calculated to ignite the means $4^a$ when one is pressed or struck against the other, the said surface 9 being for instance composed of amorphous phosphor 8 parts, sulfide of antimony 9 parts and sufficient glue to form a binder. The surface 9 alluded to is shown in Fig. 7.

In the embodiment shown in Fig. 6 the fuel unit $1^b$ is provided in one corner and has attached thereto ignition means $4^b$. The said ignition means $4^b$ is preferably of the formula that comprises sesquisulfid of phosphorus 90 grams, chlorate of potash 800 grams, peroxid of iron 770 grams, zinc white 770 grams, powdered glass 140 grams, glue 100 grams, water 290 grams. When this formula is employed, the pan may be provided with a surface 9, Fig. 7, of the formula before described as made up of chlorate of potash 32 parts bichromate of potash 12 parts, red lead 32 parts, sulfid of antimony 24 parts and glue 14 parts. This provision renders it impossible for the ignition means to be lighted by accident.

When desired, the cover of the container in which a plurality of the heater units are carried may be provided for the sake of safety, with a surface such as 9 in Fig. 7, for lighting the ignition means $4^b$. This, however, I have deemed it unnecessary to illustrate.

The formulas herein indicated are not of my invention, and it is, therefore, to be understood that any desired formulas may be employed without affecting my invention.

Having described my invention, what I claim and desire to secure by Letters-Patent, is:—

1. In a heater unit for vulcanizing tire patches, the combination of a fuel element in a receptacle by which the patch is carried, ignition means carried by the fuel element, and igniting means complementary to said ignition means.

2. In a heater unit for vulcanizing tire patches, the combination of a fuel element in a receptacle by which the patch is carried, ignition means carried by the fuel element, and an igniting strip withdrawable from the receptacle to be thereby frictionally engaged with the ignition means.

3. In a heater unit for vulcanizing tire patches, the combination of a fuel element in a receptacle by which the patch is carried, ignition means carried by the fuel element and igniting means complementary to said ignition means and arranged to be frictionally engaged therewith.

4. In a heater unit for vulcanizing tire patches, the combination of a fuel element in a receptacle by which the patch is carried, ignition means carried by the fuel element at one corner thereof, and complementary igniting means.

5. In a heater unit for vulcanizing tire patches, the combination of a fuel element in a receptacle by which the patch is carried, ignition means carried at one corner of the fuel element, and igniting surface carried by the receptacle to coöperate with and light the ignition means when one is operated against the other.

In testimony whereof I affix my signature.

HARVEY R. ZIEBELL.